United States Patent [19]
Carmichael et al.

[11] Patent Number: 5,403,140
[45] Date of Patent: Apr. 4, 1995

[54] DYNAMIC SWEEPING MECHANISM FOR A LINE SCAN CAMERA

[75] Inventors: Larry K. Carmichael, Westminster; Timothy C. Ostwald, Louisville, both of Colo.

[73] Assignee: Storage Technology Corporation, Louisville, Colo.

[21] Appl. No.: 135,476

[22] Filed: Oct. 13, 1993

[51] Int. Cl.6 ................................................ B65G 1/06
[52] U.S. Cl. .................................... 414/280; 250/561; 414/274; 901/47
[58] Field of Search ............... 414/277, 280, 225, 226, 414/274; 901/1, 47; 250/561; 395/94

[56] References Cited

U.S. PATENT DOCUMENTS

| | | | |
|---|---|---|---|
| 4,969,108 | 11/1990 | Webb et al. | 901/47 X |
| 4,979,135 | 12/1990 | Moy | 395/94 |
| 4,981,353 | 1/1991 | Murakawa et al. | 901/47 X |
| 5,034,618 | 7/1991 | Akeel et al. | 250/561 |
| 5,215,423 | 6/1993 | Shulte-Hinsken et al. | 901/47 X |
| 5,219,258 | 6/1993 | Yeakley | 901/47 X |
| 5,236,296 | 8/1993 | Ostwald | 414/280 |
| 5,255,096 | 10/1993 | Boyle | 395/94 X |
| 5,277,534 | 1/1994 | Anderson et al. | 414/280 X |
| 5,280,179 | 1/1994 | Pryor et al. | 901/47 X |
| 5,303,034 | 4/1994 | Carmichael et al. | 250/561 X |

Primary Examiner—David A. Bucci
Attorney, Agent, or Firm—Sterne, Kessler, Goldstein & Fox

[57] ABSTRACT

A dynamic sweeping mechanism which drives a line-scan camera's field of view in a direction which is substantially perpendicular to the scan direction. The operation of the dynamic sweeping mechanism enables the line scan camera to make multiple scans across a target, providing the image processor the necessary image information to generate a two-dimensional image of the object as well as positioning the line scan camera at an optimal angle of view to obtain accurate single scan image data. The scan line angle of view is dynamically swept in a rotational manner about an axis of rotation which is parallel to the scan line under the control of either a dedicated drive mechanism or coupled to pre-existing drive mechanisms in the robotic hand mechanism.

17 Claims, 10 Drawing Sheets

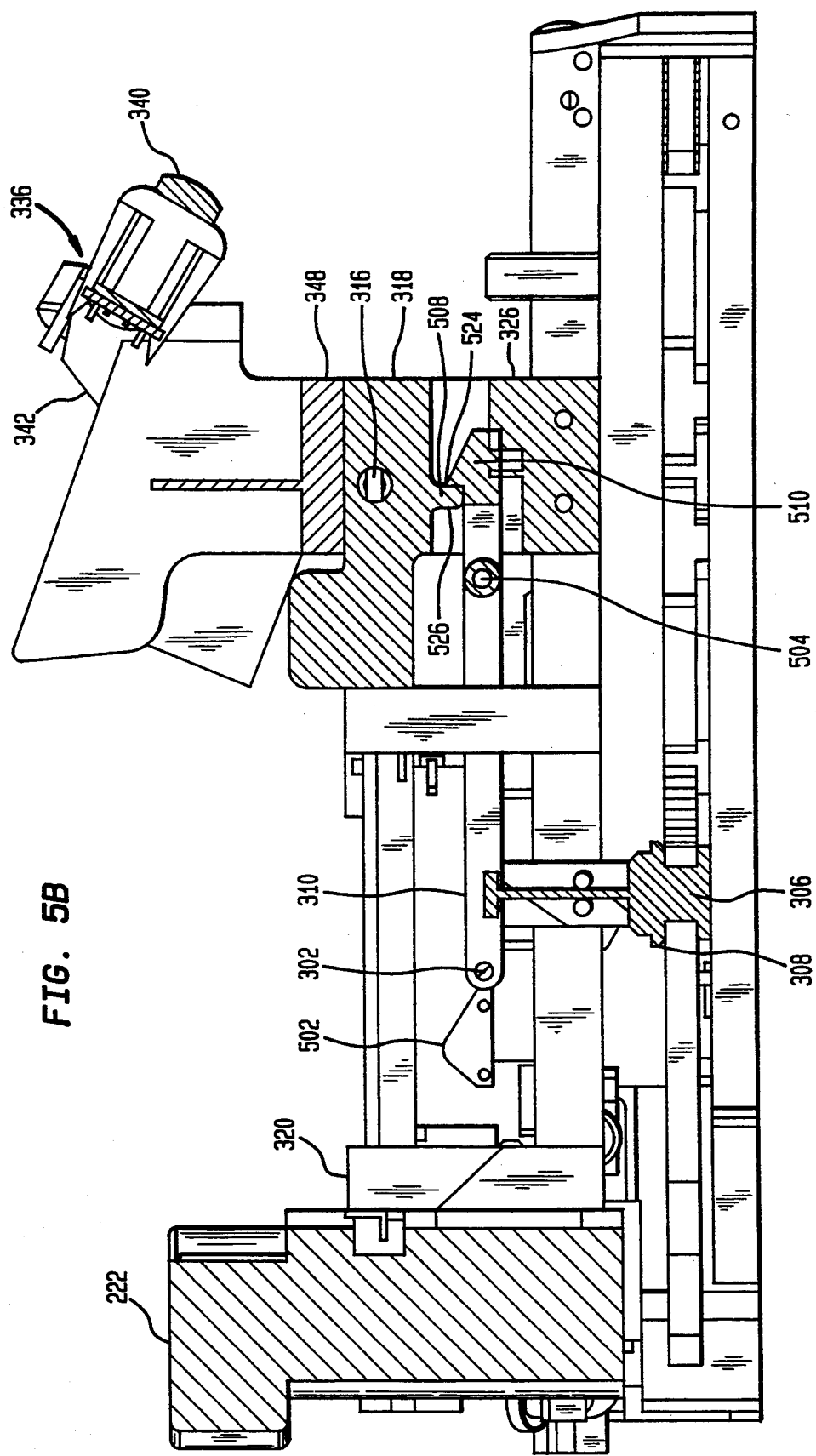

DYNAMIC SWEEPING MECHANISM FOR A LINE SCAN CAMERA

BACKGROUND OF THE INVENTION

1. Field of the Invention

This invention relates generally to robotic visual systems, and, more particularly, to an apparatus which dynamically controls the field of view of a line scan camera.

2. Related Art

With the advent of robotics technology, automated processing has come into widespread use in numerous facets of today's industry. Robotic systems are employed to perform a myriad of functions from assembly line processes to materials processing to real-time operational processes. These robotic systems are often implemented using a computer-controlled robotic arm.

Applications for robotic arms in assembly line processes include welding, painting, and testing. In the materials processing environment, robotic applications can include, for example, locating materials or chemicals. In real-time operational environments, robots are used to perform operational functions such as automated order picking. In computer operational environments, robots are used to perform tape retrieval and mounting functions. An example of such an automated tape cartridge storage system is the StorageTek Wolf-Creek Library Storage System, manufactured by Storage Technology Corporation, Louisville, Colorado, U.S.A.

To optimize performance of robotic systems in the above-mentioned and other applications, a robotic arm must be quickly and precisely positioned to perform its task. To illustrate this concept, the tape selection and mounting robotic system will be used as an example. In this example, the tape selection robotic system must locate a correct tape to be loaded and quickly and precisely align its arm to select the proper tape. If the alignment is imprecise, a critical error may result. The robotic arm could miss the tape entirely or even retrieve the wrong tape. In addition, if the arm is extended when aligned imprecisely, damage to the tape, the robotic arm, or a tape storage bin may result.

Generally, a trade-off exists between the speed and precision with which a robotic arm may be aligned. However, a robot arm which provides a higher degree of precision will allow a system to be designed to tighter specifications. For the tape selection example, this means that bins which house the tape cartridges can be made smaller and positioned more closely to one another. As a result, system size is reduced and tape access time is quicker because the robotic arm has less distance to travel between tapes.

In conventional systems, attaining a higher degree of alignment precision requires more time. Some conventional systems use a reach-out-and-touch technique whereby the arm is extended slowly to sense its position with respect to the tape and adjust alignment accordingly. In addition, if alignment is imprecise, retrieval must be done more slowly to minimize the amount of damage that could be caused by "crashing" the misaligned arm into a bin or a tape cartridge.

Typically, a robotic arm has course control to position the robotic arm in the vicinity of the desired object and fine control to properly align the robotic arm for precise operational movements. The motors which drive a robotic device for coarse positioning commonly operate under the general method of digital closed loop servo mechanism control. For "fine" alignment, many conventional systems employ a vision system as part of the robotic system. The camera, in effect, becomes the "eyes" of the robotic system. A controller within the robotic system uses the camera to search for known objects. These objects may be calibration patterns, referred to as targets, or identification patterns, generally bar code labels. The controller receives electronic signals from the camera indicating the location of the robotic arm with respect to the object. The controller then aligns the robotic arm using that object image as a positioning guide.

Many conventional robotic arm calibration arrangements employ a video camera which provides a two-dimensional pixel array output. This pixel array output is utilized by an image processor to determine the specific location of the scanned image relative to the robotic arm. In such systems, a large number of pixels in the array have to be processed before the relative locations can be determined. The image processing time impedes the performance of the system, making such systems impractical for applications requiring high image-based data throughput.

Other conventional techniques employ line scan cameras. Line scan cameras provide higher reliability, increased resolution, and significantly faster dam transfer rates at a lower cost relative to two-dimensional area video cameras.

The line scan camera is designed to read a series of object images in a linear pattern. The term "scan" actually refers to the method by which each pixel of a charge coupled device (CCD) array is electronically polled to resolve an image into decipherable data. The term "line scan" means that the resulting image is in fact a linear trace of points across a line, which runs across the object. Due to the short amount of time required to perform a single scan and create an image, these camera systems are desirable in high speed imaging systems that require high image-based data throughput.

However, there are several drawbacks to using a line scan camera in robotic object handling systems. One inherent problem in utilizing a line scan camera to obtain stationary calibration and/or bar code information in robotic systems is that a single scan may not obtain all the necessary information. This is typically due to positional errors of either the object or camera. Positional errors of the object may result from such conditions as the bar code label or calibration pattern being disposed at an arbitrary position or inclination on the reference surface. Positional errors of the line scan camera may result from deviations in the mechanical and positional tolerances of the mechanism upon which the line scan camera is mounted. These positional errors reduce the reliability of a single scan line, resulting in an incomplete image of the bar code or calibration pattern. Thus, conventional single-scan line scanning techniques typically cannot be efficiently used in robotic object handling systems.

One solution for achieving a complete image has been to dynamically reposition the robotic mechanism upon which the line scan camera is mounted to assist the line scan camera in obtaining a complete image. In such a system, the robotic mechanism moves in a direction perpendicular to the scan direction. This enables the line scan camera to make multiple scans through the object. However, positioning a robotic arm in two dimensions relative to a known object using a line scan camera that produces only a one dimensional "slice" through its image has been found to be impractical. Accurately positioning the robotic arm relative to the object along the axis in which the line scan camera views (e.g., horizontal axis) is relatively easy, as long as the object is found within the camera's field of view. Positioning the robotic arm with respect to the object in the axis perpendicular to the axis of the scan line (e.g., vertical axis), however, is considerably more difficult since the line scan camera does not "view" in that axis. As a result, a complete image of the object cannot be achieved using this approach without incurring the loss of efficiency and response time due to the additional time required to accurately reposition the robot arm in the perpendicular direction.

This lost efficiency becomes prohibitive in those circumstances where it is necessary or desirable to read an object when the robotic mechanism is performing retrieval and mounting operations. Another mode of operation wherein the time required to reposition the robotic arm becomes prohibitive is during the audit period. The audit period is that time where the line scan camera is used to identify and locate all object bar code labels and positional targets to determine their location. This information is forwarded to a processing system which then builds and maintains a database of the storage system contents, and determines the position of the arm relative to the targets.

What is needed, therefore, is a mechanism which will dynamically control the position of a line scan camera associated with a robotic arm, enabling it to sweep the line of focus through a known displacement. This dynamic positioning must occur at a known or predictable velocity for the line scan camera's processing systems. It is desirable to achieve this two-directional movement of the line scan camera's field of view without requiring the associated robotic mechanism to move through unnecessary displacements.

SUMMARY OF THE INVENTION

The present invention is a dynamic sweeping mechanism which drives a line-scan camera's field of view in a direction which is substantially perpendicular to the scan direction. The operation of the dynamic sweeping mechanism enables the line scan camera to make multiple scans across a target, providing the image processor the necessary image information to generate a two-dimensional image of the object. The dynamic sweeping mechanism also positions the line scan camera at an optimal angle of view to obtain accurate single scan image data.

The present invention dynamically sweeps the angle of view of the line scan camera. A means is included for pivoting the line scan camera about an axis of rotation parallel to the scan line. This is done under the control of either a dedicated drive mechanism or pre-existing drive mechanisms in the robotic hand mechanism.

The dynamic sweeping mechanism supports the line scan camera relative to the robotic arm mechanism such that an associated light assembly and the line scan camera do not interfere with the operation of the robotic hand mechanism. The light assembly is coupled to the line scan camera so that the light assembly and line scan camera move together in a single unit. The light assembly directs light in the line scan camera's field of view at all times. The light assembly and line scan camera are coupled to a support means for rotation about an axis of rotation. Rotation about the axis results in the scan line of the line scan camera moving in a direction which is substantially perpendicular to the scan line direction.

Thus, the present invention enables the scanning of calibration and identification patterns at any time during the operation of the system without affecting performance. In addition, the positional accuracy of the robot may be verified at certain critical locations during normal robot operations.

Another advantage of the dynamic sweeping mechanism is that it increases the speed of the overall system due to its ability to increase the speed of certain critical tasks in the system. In addition, calibration target and bar code label images may be obtained more frequently, thereby increasing the reliability of the system.

Further features and advantages of the present invention as well as the structure and operation of various embodiments of the present invention are described in detail below with reference to the accompanying drawings.

BRIEF DESCRIPTION OF THE FIGURES

The present invention will be described with reference to the accompanying drawings, wherein like reference numbers indicate identical or functionally similar elements. Additionally, the left-most digit of a reference number identifies the drawing in which the reference number first appears.

FIG. 5B is a cross-sectional view of the dynamic camera sweeping mechanism taken along line II—II of FIG. 4;

DETAILED DESCRIPTION OF THE PREFERRED EMBODIMENTS

I. Introduction

The present invention is a dynamic sweeping mechanism which drives a line-scan camera's field of view in a direction which is substantially perpendicular to the scan direction. The operation of the dynamic sweeping mechanism enables the line scan camera to make multiple scans across a calibration pattern or identification pattern, providing the image processor the necessary image information to generate a two-dimensional image of the object. It also enables the line scan camera to be optimally positioned to obtain accurate single scan image data.

The present invention enables an object to be scanned while the robotic hand mechanism on which it is mounted remains stationary, thereby eliminating robotic arm positioning which is dedicated solely to camera imaging. This improves the operational efficiency of the robotic arm as well as data throughput of the storage system.

II. System Environment

Figure 1:
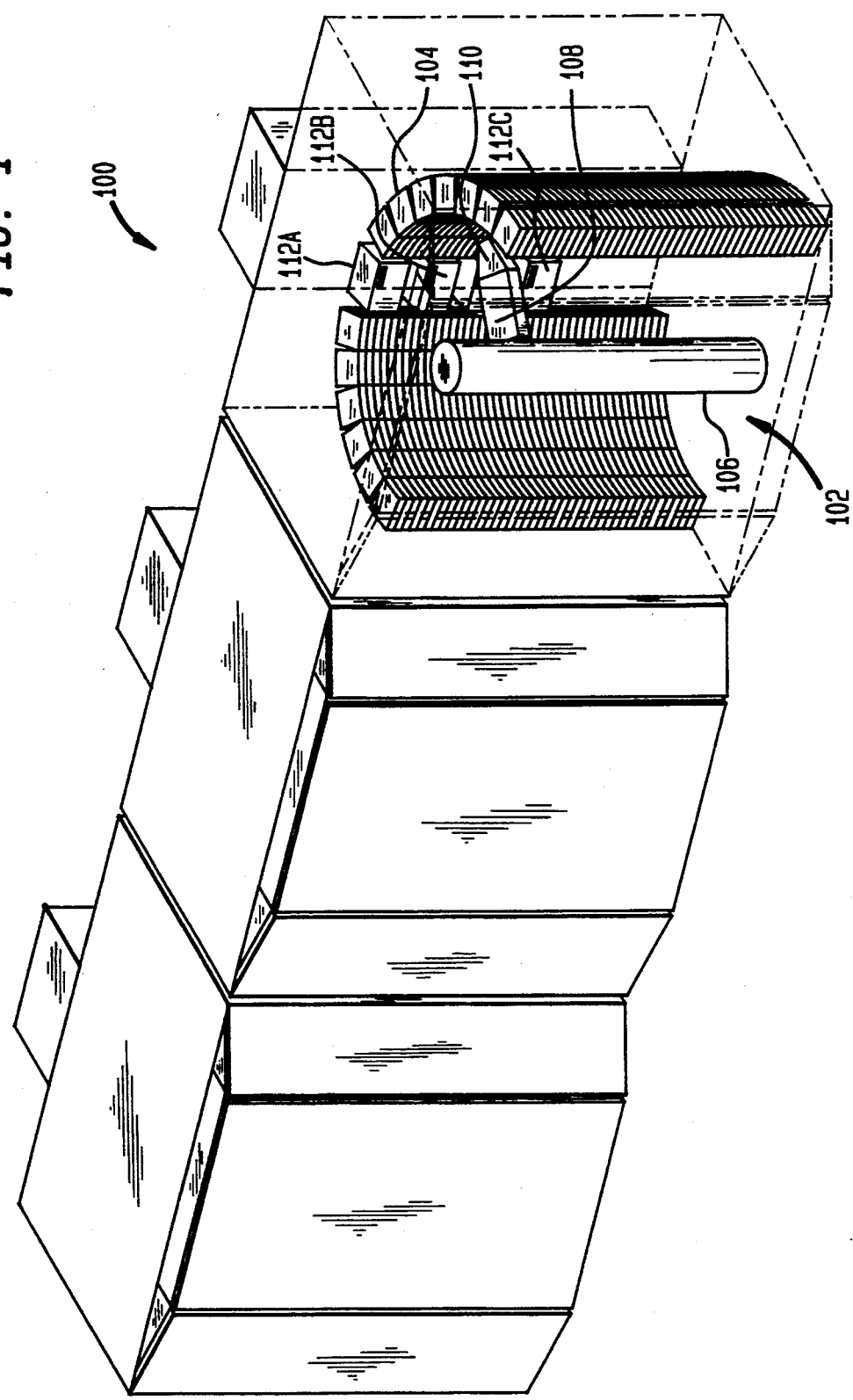
FIG. 1 is a typical robotic cartridge handling system in which the present invention may be implemented.

FIG. 1 illustrates a perspective view of a typical automated magnetic tape cartridge storage system 100. The basic architecture of robotic cartridge storage system 100 is that of a center pivot robotic handling mechanism 102 surrounded by a polygonal array of radially arranged and inwardly disposed cartridge storage locations 104. Robotic cartridge handling mechanism 102 consists of a center pivot 106 with a positioning arm 108 rotatably attached thereto. A magnetic tape cartridge retrieval mechanism 110 is located at the distal end of the positioning arm 108 and consists of a finger gripper mechanism (shown in detail in FIG. 2). Robotic handling mechanism 102 transports the cartridges between storage locations 104 and magnetic tape drives 112A–112C (collectively and generally referred to as 112).

The gripper mechanism is extendable in a radial direction to grasp a magnetic tape cartridge stored in a selected cartridge storage location 104. Drive motors (not shown) are included to enable the positioning arm 108 to rotate about the center pivot 106 as well as to translate in a vertical direction. This enables the robotic arm to position the retrieval mechanism 110 in alignment with a selected one of the storage locations 104 in the cylindrical array.

Once the cartridge in the selected cartridge storage location is securely grasped by retrieval mechanism 110, it is retracted in a radial direction to retrieve the cartridge from its associated storage location 104. Once the cartridge is retrieved, the positioning arm 108 translates the retrieval mechanism 110 in alignment with a selected one of the magnetic tape drives 112 included in the automated magnetic tape cartridge storage system 100. The retrieval mechanism 110 then extends the retrieved magnetic tape cartridge to insert it into the selected tape drive 112. Once the magnetic tape cartridge is firmly placed in the tape drive, the retrieval mechanism 110 releases the magnetic tape cartridge and retracts to clear the tape drive and proceed with another cartridge transport operation.

The automated magnetic tape cartridge storage system shown in FIG. 1 is implemented in the WolfCreek Library Storage System, manufactured by Storage Technology Corporation, Louisville, Colorado, U.S.A. The WolfCreek automated magnetic tape cartridge storage system is fully described in U.S. Patent Application, titled "Expandable Magnetic Tape Cartridge Storage System," application No. 07/824,601, filed on Jan. 23, 1992, now U.S. Pat. No. 5,277,534 and naming as inventors J. Anderson, K. Manes, and T. Studerbaker, incorporated herein by reference in its entirety. Another automated data storage library system wherein the present invention may be utilized is the 4400 Automated Cartridge System (ACS), also manufactured by Storage Technology Corporation, which is fully described in U.S. Pat. Nos. 4,864,511 and 4,928,245 to Moy et al., incorporated herein by reference in their entirety.

III. Robotic Hand Architecture

Figure 2:
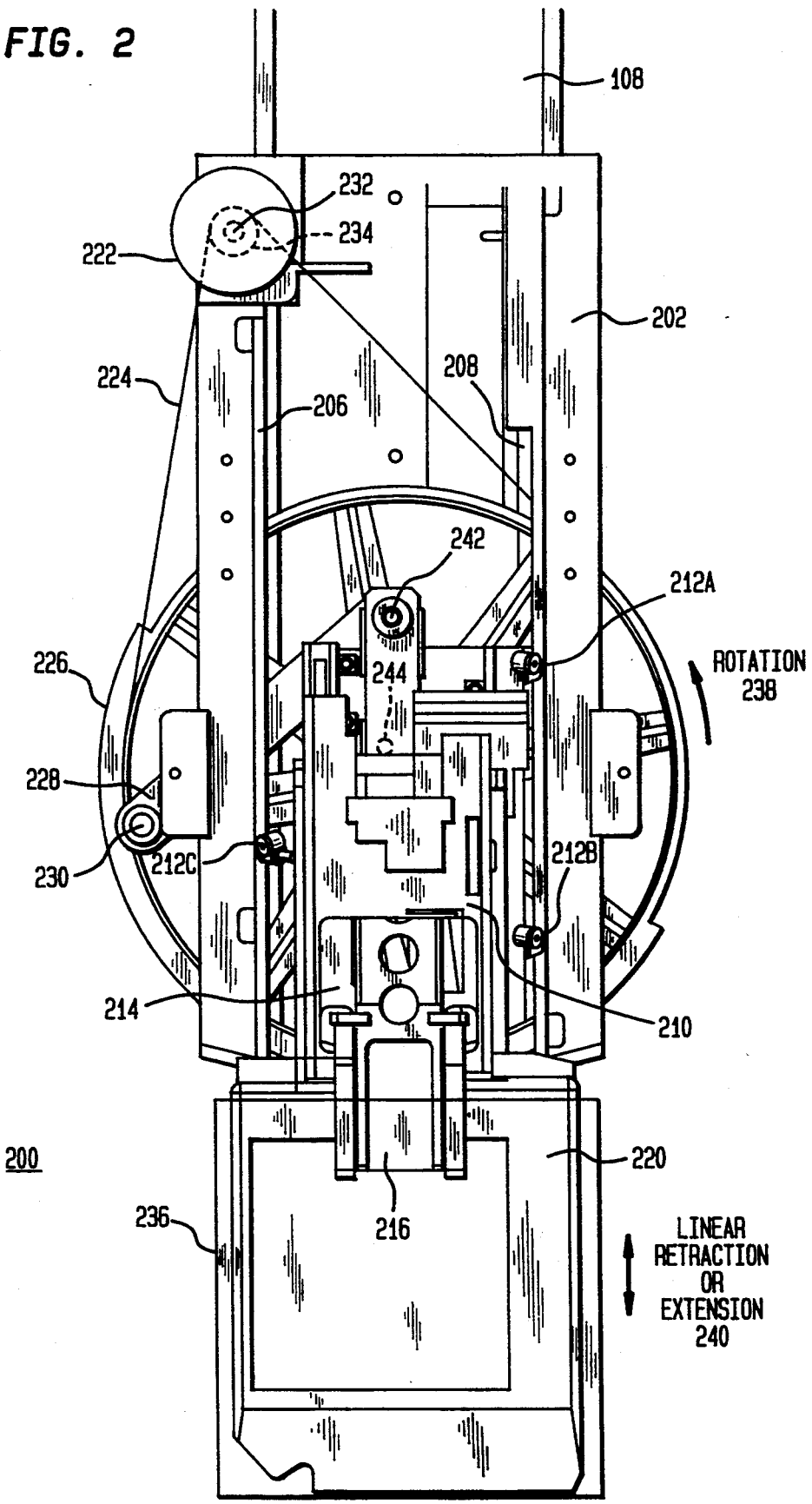
FIG. 2 is a top view of the robotic hand mechanism on which the present invention is implemented.

FIG. 2 illustrates a top view of the robotic hand mechanism on which the preferred embodiment of the present invention is implemented. Referring to FIG. 2, robotic hand mechanism 200 is attached to robotic positioning arm 108 and is used to pick and place objects from object storage locations 104. Since the preferred embodiment of the present invention is implemented in a magnetic tape cartridge storage system, the object manipulated by robotic hand mechanism 200 is a magnetic tape cartridge 220. However, adopting robotic hand apparatus 200 to manipulate other types of objects would be within the purview of one skilled in the relevant art.

Robotic hand mechanism 200 includes a frame 202 that is attached to the robotic positioning arm 108. Frame 202 supports track surfaces 206, 208, which extend from one end of frame 202 to the other. A carriage 210 rides on track surfaces 206, 208 via a plurality of rollers 212A–212C (collectively and generally referred to as 212). Rollers 212A and 212B ride on track surface 208. Rollers 212C ride on track surface 206. The use of the triangular arrangement of rollers on a cylindrical track surface as illustrated in FIG. 2 provides a low friction yet stable carriage/track mechanism with the carriage 210 traversing a path defined by track surfaces 206, 208.

Carriage 210 supports a gripper assembly 214 that includes a pair of fingers for grasping a magnetic tape cartridge 220 which may be located, for example, in a tape cartridge storage location 104. One finger 216 of gripper assembly 214 is shown in FIG. 2. The other finger of gripper assembly 212 is obstructed from view by magnetic tape cartridge 220. The motion of carriage 210 in the linearly radial direction indicated by arrow 240, from its retracted position to its fully extended position, is accomplished by a carriage transporting apparatus.

The carriage transporting apparatus includes components which work together to extend and retract gripper assembly 214 to retrieve and replace magnetic tape cartridge 220. The main components of carriage transporting apparatus which perform these functions are a connecting link 228, a reach pulley 226, a drive motor 222, and a continuous timing belt 224.

Connecting link 228 is pivotally attached at one end to carriage 210 via a pivot 242. The other end of connecting link 228 is pivotally connected to crank pulley 226 via pivot 230. Connecting link 228 and the top surface (radial direction) of crank pulley 226 are substantially co-planar with the plane defined by track surfaces 206, 208.

Connecting link 228 applies a force to carriage 210 to transport carriage 210 in the linear direction 240 as a function of the rotation of connecting link pivot point 230 attached to reach pulley 226. Reach pulley 226 is substantially cylindrical in shape and rotates on a pivot shaft 244 located at the center of reach pulley 226. Reach pulley 226 is powered by continuous timing belt 224 which is driven by drive motor 222.

Drive motor 222 includes a shaft 232, one end of which is attached to a drive pulley 234 which engages continuous timing belt 224. The counterclockwise rotation of drive shaft 232 and attached drive gear 234 by drive motor 222 causes timing belt 224 to travel in a counterclockwise direction. This is the direction of rotation illustrated by arrow 238 in FIG. 2. This counterclockwise rotation imparts a similar rotation of reach pulley 226. This causes pivot point 230 to traverse a circle that is coextensive with the circumference of reach pulley 226. The motion of pivotal connection 230 is defined by the radius and rotational speed of reach pulley 226.

As the end of the connecting link 228 traverses the path described above, the opposite end of connecting link 228, which is coupled to carriage 210, is restricted in its travel to the linear path defined by carriage 210 and track surfaces 206, 208. Thus, as crank pulley 226 travels in rotational direction 238, carriage 210 travels in the linear direction 240.

The counterclockwise rotation of drive motor 222 causes the gripper mechanism to travel in a linear direction from the retracted position to the extended position. Continued counterclockwise rotation of drive motor 222 causes the gripper mechanism to then travel in the reverse direction, from the extended position back to the retracted position. Rotation of drive motor 222 in either direction will result in gripper mechanism 214 extending and retracting as described above.

The robotic hand apparatus described above and illustrated in FIGS. 2–4 is more fully described in commonly owned U.S. Pat. No. 5,236,296 to Ostwald, which is herein incorporated by reference in its entirety.

IV. Line Scan Camera And Light Assembly

Figure 3:
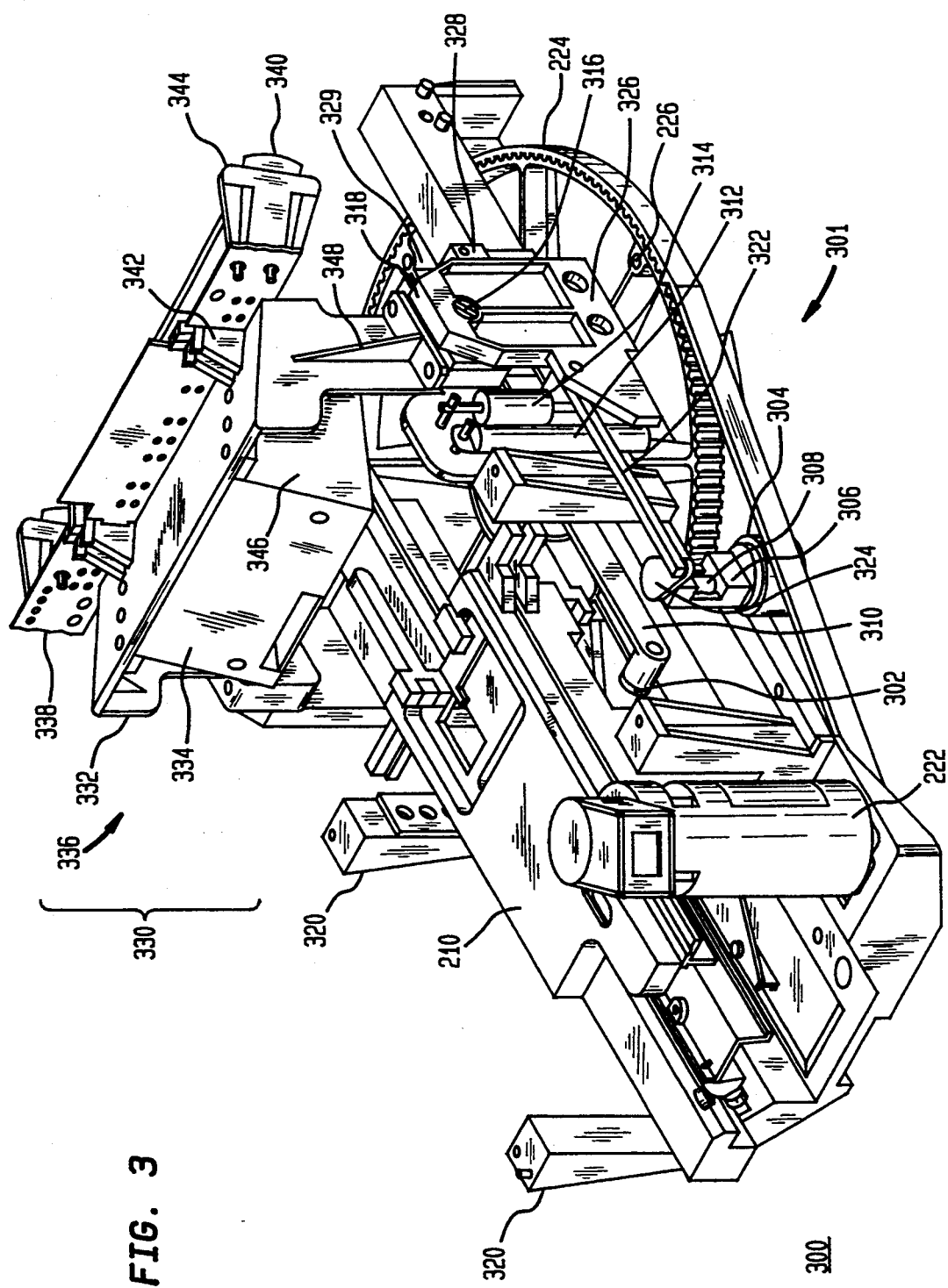
FIG. 3 is an isometric view of the dynamic sweeping mechanism of the present invention integrated with a robotic hand mechanism and line scan camera.
Figure 4:
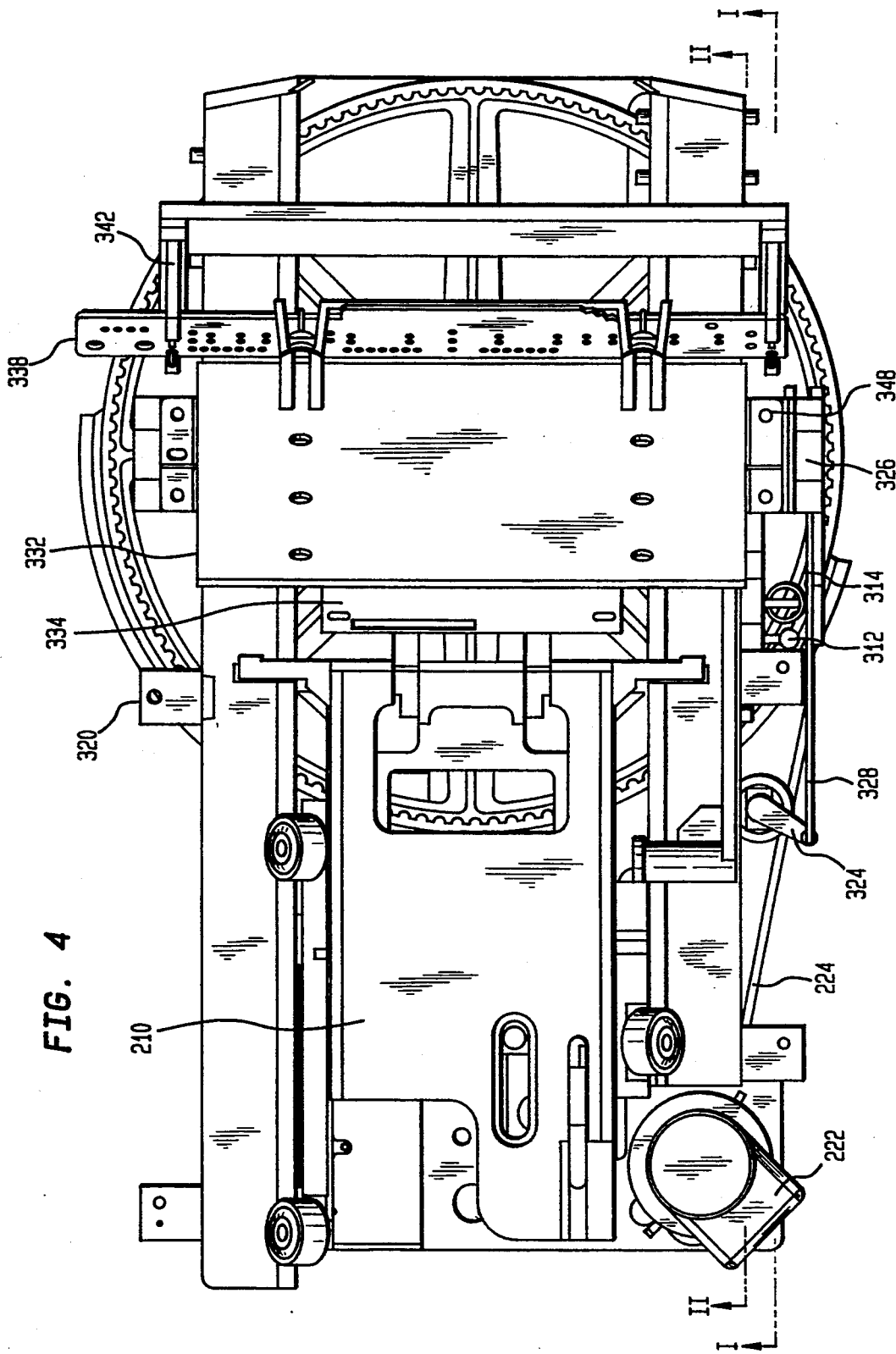
FIG. 4 is a top view of the robotic hand assembly.

FIGS. 3 and 4 illustrate isometric and top views, respectively, of robotic hand mechanism 200 with the addition of a camera and light assembly 330 and the dynamic sweeping mechanism 301 of the present invention. This combined assembly is referred to as the robotic hand assembly 300.

Referring to FIG. 3, line scan camera and light assembly 330 comprises a camera/light assembly bracket 332, a line scan camera 334, and a light assembly 336. Camera/light assembly bracket 332 has a camera sleeve 346 in which line scan camera 334 is mounted. In FIGS. 3 and 4, only the rear of line scan camera 334 is visible.

Light assembly 336 is attached to camera/light assembly bracket 332 by light assembly bracket 342. Light assembly bracket 342 places the light assembly 336 in an extended position from bracket 332 over line scan camera 334. In this position, light assembly 336 directs light towards a calibration target or object identification label. In this position, light assembly 336 does not obstruct the field of view of line scan camera 334 or interfere with the movement of gripper mechanism 214. Light assembly 336 includes a light generation card 338, a lens bracket 344, and a lens assembly 340. The light generation card 338 is a printed circuit board containing a bank of light emitting diodes (LEDs).

Catch release plates 318 provide a flush mounting surface for attachment of camera and light assembly 330 to robotic hand mechanism 200. Catch release plates 318 are rotatably coupled to vertical support members 326 through sweep mechanism pivots 316. Camera/light bracket 332 is attached to catch release plates 318 via bracket mounting arms 348. Camera/light assembly bracket 332 is pivotally coupled to robotic hand mechanism 200 through catch release plates 318 and bracket mounting arms 348. Vertical support members 326 support the camera/light assembly 330 and catch release plates 318 above robotic hand mechanism 200 at a predetermined position (discussed below).

Camera and light assembly 330 is capable of rotating about pivot 316. The normal scan direction of line scan camera 334 is parallel with the axis of rotation of line scan camera 334 as defined by pivot 316. Pivoting line scan camera 334 about the axis of rotation defined by sweep mechanism pivot 316 causes the angle of view or incidence angle of line scan camera 334 to travel in a direction perpendicular to the scan direction.

V. Dynamic Sweeping Mechanism

1. Robotic Hand Mechanism Interface

As discussed above, the reach function of robot hand mechanism 200 is performed by a motor and pulley drive system. Reach motor 222 drives continuous timing belt 224 which in turn drives reach pulley 226 to drive gripper assembly 214 in a linearly radial direction to extend/retract from/to robotic hand mechanism 200.

The pre-existing reach motor 222 is also utilized to drive the dynamic sweeping mechanism of the present invention. In addition to driving gripper assembly 214 and carriage 210, reach motor 222 and belt 224 also rotate drive pulley 304. Thus, the present invention utilizes presently-existing drive mechanisms of robotic hand mechanism 200 to minimize the complexity and weight of the present invention. No additional servo motors and associated amplifier electronics are necessary.

Referring to FIGS. 3 and 4, driven by the timing belt 224, a drive pulley 304 rotates drive shaft 308 through a one-way slip clutch 306. As reach motor 222 rotates in the counterclockwise direction, slip clutch 306 allows the disengaged movement of drive pulley 304. When drive motor 222 is driven in the opposite direction, however, slip clutch 306 engages drive shaft 308 to drive pulley 304. Thus, by traveling in a clockwise direction, reach motor 222 is coupled to and controls the dynamic sweeping mechanism through continuous belt 224, pulley 304, and slip clutch 306.

The rotation of reach motor 222 in a clockwise or counterclockwise direction drives the gripper assembly 214 and dynamic sweeping mechanism. As discussed above, reach motor 222 is driven in the counterclockwise direction to perform the normal pick (retrieval) and place (replacement) movements of robotic hand mechanism 200. Thus, the normal operation of robotic hand mechanism 200 does not engage drive pulley 304. The clockwise rotation of drive pulley 304, which is not utilized by robotic hand mechanism 200, is used by the dynamic sweeping mechanism of the present invention.

In the preferred embodiment of the present invention, drive pulley 304 is a timing pulley which is coupled to timing belt 224. However, as one skilled in the relevant art would know, the present invention may be implemented with any form of drive pulley. For example, drive pulley 304 may be a friction pulley. Drive pulley 304 may also be designed to be coupled with a different component of the pre-existing reach drive system. For example, drive pulley 304 may be configured to be coupled with reach pulley 226 or drive motor 222 instead of timing belt 224. The factors which will determine which approach is best are the size of the robotic hand, the functions performed by the robotic hand, the relative position of the drive sources, and the placement of the line scan camera, among others. In addition, the present invention may be used with other types of reach drive mechanisms. For example, drive pulley 304 may be configured to operate with a lead screw or belt-driven reach drive mechanism.

The present invention contemplates other means to achieve the disengaged movement of the gripper assembly and dynamic sweeping mechanism. For example, a slip clutch may be used to disengage the reach pulley 226 from carriage 210. Other means to selectively couple the operation of the dynamic sweeping mechanism and the operation of the robotic hand mechanism 200 will be apparent to a person skilled in the relevant art and are considered within the scope of the present invention.

The present invention may also be implemented with a dedicated servo mechanism and control circuit if design considerations call for it. For example, if the weight which the dynamic sweeping mechanism adds to the robotic arm is not critical, or if the pre-existing drive mechanisms are non-existent or inaccessible, then drive pulley 304 may be replaced with a dedicated servo mechanism.

2. Latching Components

Figure 5A:
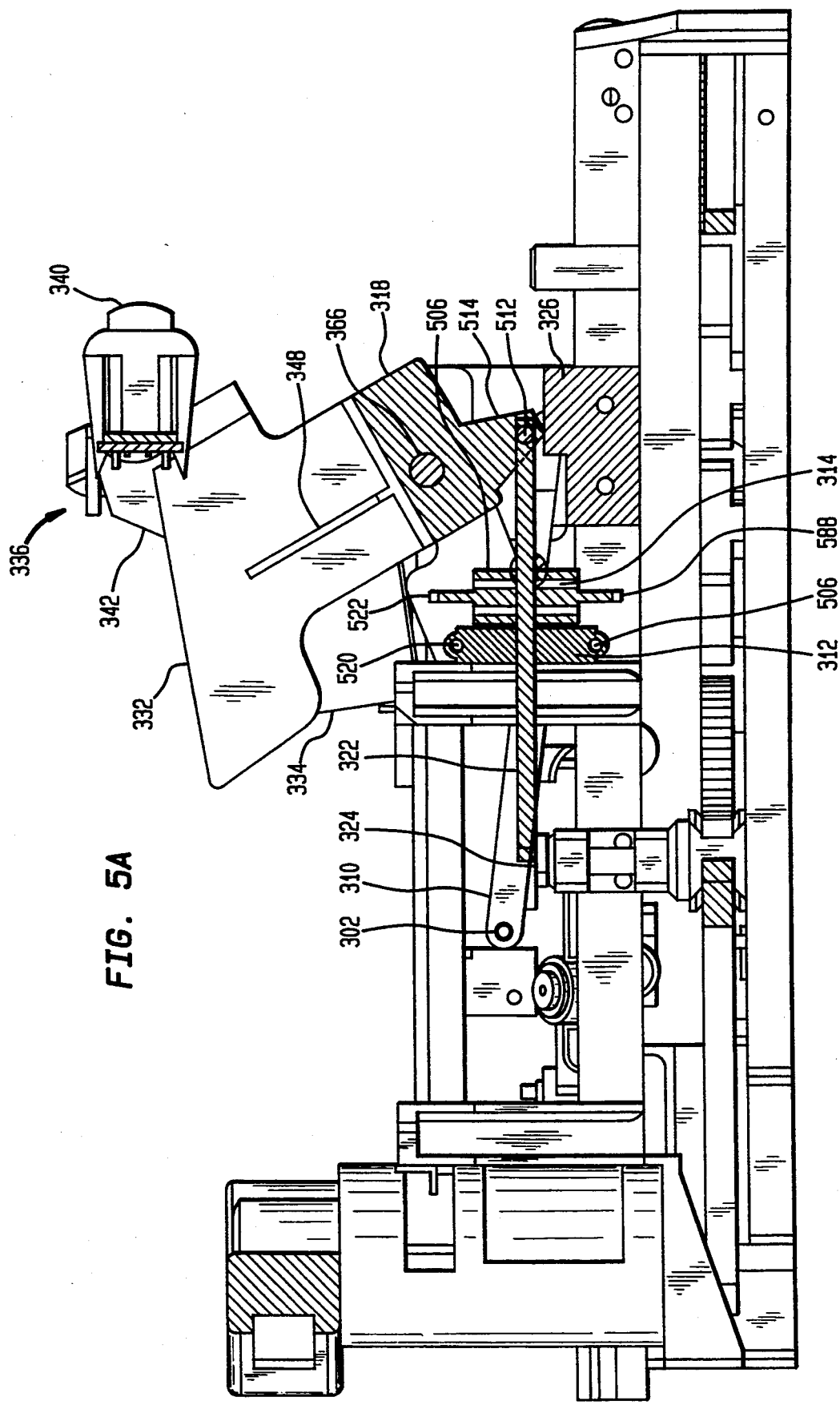
FIG. 5A is a cross-sectional view of the dynamic camera sweeping mechanism taken along line I—I of FIG. 4.

FIGS. 5A and 5B illustrate cross-sectional views of robotic hand assembly 300 taken along cross-section I—I and II—II, respectively, of FIG. 4.

Referring to FIG. 5A, connected to drive shaft 308 on a side opposite slip clutch 306 is a drive arm 324. Drive arm 324 extends outward from its point of connection with drive shaft 308. At a radial point on drive arm 324, a camera sweeping drive linkage 322 is pivotally attached. The initial position of drive arm 324 corresponds to the "up and unlatched" (defined below) position of line scan camera 334. The final position of drive arm 324 corresponds to the normal or "down and latched" position of line scan camera 334 (discussed below). The largest rotational distance that drive arm 324 may travel is 180°, from the point of connection with drive linkage 322 positioned as far forward of drive shaft 308 as possible, to the backmost position, pointing towards the rear of robotic hand assembly 300. In the preferred embodiment of the present invention, however, the drive arm 324 is rotated a fraction of the angular rotation available. This short distance is all that is needed to latch the line scan camera 334 into the down and latched position. The drive arm 324 is positioned such that this clockwise angular rotation places the drive arm past the backmost position. The ensures that drive arm 324 continues to rotate in a clockwise direction when the line scan camera is moved to the up and unlatched position.

The opposite end of camera sweeping drive linkage 322 is pivotally connected to outer catch flange 514 of release catch plate 318 at drive linkage pivot 512. Thus, as drive arm 324 rotates in a clockwise direction, and drive linkage 322 translates in a rearward direction, outer catch flange 514 is pulled in a rearward direction by drive linkage 322 at drive linkage pivot point 512. This causes release catch plate 318 to rotate around sweep mechanism pivot 316 in a clockwise direction, driving line scan camera 334 to pivot from the up and unlatched position to the down and latched position.

In the preferred embodiment, drive linkage 322 is coupled to release catch plate 318 at drive linkage pivot point 512. Drive linkage pivot point 512 is located on the release catch plate outer catch flange 514. This positions the drive linkage pivot point at a predetermined fixed distance from sweep mechanism pivot 316. This radius determines the rate at which the line scan camera and light assembly 330 rotates as drive linkage 322 translates in the rearward direction. This radius also determines the rotational distance that the camera/light assembly 330 travels while being rotated in the downward direction. Thus, drive linkage 322 may be pivotally connected to release catch plate 318 at any radial point which a particular application may require. This is discussed in further detail below.

In the preferred embodiment of the present invention, drive pulley 304, drive shaft 308, drive arm 324, and linkage 322 work together to convert the rotational motion of the reach drive system of robotic hand mechanism 200 to a linear movement of camera sweeping drive linkage 322. This linear motion of drive linkage 322 is then converted to a pivoting movement of camera and light bracket 332. The axis of rotation around which camera and light bracket 332 pivots is parallel to the scan line of line scan camera 334 and perpendicular to the axis of rotation of drive motor 222. The present invention may, however, be implemented with any means of converting the rotational force of drive motor 222 to the linear movement of linkage 322. In addition, alternative embodiments of the present invention include conversion mechanisms which directly translate motion of the reach axis system to rotational motion in the axis of rotation of sweep mechanism pivot 316. For example, a gear may be connected to release catch plate 318 for rotating release catch plate 318 about pivot point 316. The gear may then be rotationally coupled to the top surface of reach pulley 226. The means by which this conversion of motion is implemented should have the capability of being disengaged from the drive motor 222 to achieve the selective operational coupling discussed above.

Referring to FIG. 5B, release catch plate 318 includes a catch 508 which extends from the bottom of release catch plate 318. Catch 508 is obstructed from view by release catch plate outer catch flange 514 in FIG. 5A. As shown in FIG. 5B, catch 508 has a forward surface 524 and a rear surface 526. Rear surface 526 of catch 508 is curved and the forward surface 524 of catch 508 is flat. This configuration of catch 508 is designed to operate in conjunction with the catch release lever 310 and pawl 510, located at the end of latch release lever 310. As will be discussed in detail below, latch release lever 310 pivots around latch pivot point 504. As drive linkage 322 pulls the outer flange 514 of release catch plate 318 in the rearward direction, the rear surface 526 of catch 508 slides along the inclined surface of pawl 510. As the rear surface 526 slides along the inclined surface, it pushes pawl 510 in the downward direction, causing latch release lever 310 to rotate in the clockwise direction around latch pivot point 504. The rate and distance at which latch release lever 310 rotates is determined by the size of catch 508 and the incline of pawl 510.

The rotation of latch release lever 310 continues until the forward surface 524 of catch 508 passes pawl 510. Once this point is cleared, latch release lever 310 rotates in the counterclockwise direction until catch 508 comes in contact with pawl 510. Latch release lever 310 rotates due to a torsion spring (not shown). At this point, pawl 510 prevents release catch plate 318 from rotating in the counterclockwise direction. When release catch plate 318 is held in the rotational position shown in FIG. 5B (wherein the release catch plate 318 is prevented from rotating in the counterclockwise direction due to the relative positions of catch 508 and upper raised surface 510), the line scan camera 334 is pointing in a downward direction (discussed further below). This position is referred to as the down and latched position.

Referring to FIG. 5A, catch release plate 318 has a flange 506 extending in the rearward direction. Attached to flange 506 are camera sweeping spring 312 and return damper 314. Camera sweeping spring 312 is attached to the frame of robotic hand mechanism 200 at pivot point 516. Spring 312 is attached to flange 506 at pivot point 520. Likewise, return damper 314 is attached to the frame of the robotic hand mechanism 200 at pivot point 518 and to flange 506 at pivot point 522. Thus, as drive linkage 322 pulls release catch plate outer catch flange 514 in the rearward direction, flange 506 rotates in the upward (clockwise) direction. This in turn extends camera sweeping spring 312 and return damper 314. Once the dynamic sweeping mechanism is in its down and latched position, camera sweeping spring 312 has been extended and applies a downward force to release catch plate flange 506. This downward force on flange 506 causes forward surface 524 of catch 508 to maintain pressure against pawl 510 of latch release lever 310. This latched position is maintained until release catch plate 318 is unlatched.

In the preferred embodiment of the present invention, it is desired that line scan camera 334 be movable between two positions: a down and latched position and an up position. However, alternative embodiments of the catch 508 of release catch plate 318 and the raised upper surface 510 of latch release lever 310 may be configured such that line scan camera 334 achieves any number of desired positions. For example, release catch plate 318 may have a number of indentations or steps which correspond to particular angular rotations of line scan camera 334.

3. Unlatching Components

Referring to FIGS. 5A and 5B, the unlatching of release catch plate 318 is now described. As discussed above, camera sweeping spring 312 applies the force which maintains the front surface 524 of catch 508 against pawl 510 to hold the dynamic sweeping mechanism in the down and locked position. When pawl 510 of latch release lever 310 is moved in a downward direction, it releases catch 508, enabling camera and light assembly 330 to rotate about sweep mechanism pivot 316 under the control of camera sweeping spring 312 and return damper 314. In addition, latch release lever 310 is maintained such that pawl 510 is in the upmost position under the force of a torsion spring (not shown).

A latch release cam 502 is attached to carriage 210 and operates in conjunction with cam follower 302 and drive linkage 322 to control the unlatching operation of the dynamic sweeping mechanism. Latch release lever 310 has latch release cam follower 302 which is configured to translate over the surface of latch release cam 502. Since cam 502 is attached to carriage 210, as carriage 210 translates in the linear direction 240 to extend/retract gripper assembly 214, so does latch release cam 502. As latch release cam 502 travels in a forward direction, it lifts the latch release cam follower 302 and travels beneath it. As shown in FIGS. 5A and 5B, latch release cam 502 has a triangular shape which causes the latch release cam follower 302 to move in an increasingly upward direction as latch release cam 502 translates in a forward direction. As latch release cam follower 302 travels in an upward direction, latch release lever 310 pivots in a clockwise direction about latch pivot point 504, causing pawl 510 located on the opposite end of latch release lever 310 to translate in a downward direction. This unlatches catch 508, enabling the spring/damper system to rotate line scan camera 334 in a counterclockwise direction.

The rate at which the latch release cam follower 302 rises is determined by the slope of the upper surface of latch release cam 502. The shape of latch release cam 502 also determines the extent to which the carriage 210 has to translate in the forward direction in order to release the catch 508 of release catch plate 318. Since rotation of drive motor 222 in either direction will cause the carriage 210 to translate, one may choose any design of drive motor 222, reach pulley 226, and relative position of cam 502 and cam follower 302, to release line scan camera 334 from its down and latched position at a desired point relative to the position of carriage 210.

Since the same rotation of drive motor 222 is also used to drive the drive pulley 304 to latch the line scan camera in its down and latched position, one must design the drive pulley 304 and drive motor 222 such that the drive pulley 304 may latch the dynamic sweeping mechanism in its down and latched position while preventing the latch release cam 502 from releasing the dynamic sweeping mechanism. These pulley ratios will determine the positioning of the latch release cam 502 and the length of the latch release lever 310.

VI. Sweeping Mechanism Control

As discussed above, release catch plate 318 serves as the rotational mounting surface for the camera and light assembly 330. Release catch plate 318 is rotatable about sweep mechanism pivot 316 to cause the angle of view of line scan camera 334 to change, depending upon the controlled force that camera sweeping spring 312 and return damper 314 apply in the downward direction to release catch plate flange 506. The weight of camera/light assembly 330, camera sweeping spring 312, and return damper 314 form a typical spring/mass/damper system which predictably controls the movement and velocity of camera/light assembly 330.

Actuation sensor 328 is attached to flange 506 of release catch plate 318. Actuation sensor 328 works in conjunction with an actuation sensor flag 329 to provide the processor with an indication of when line scan camera 334 is in the necessary position to perform scans. This position represents the beginning of what is referred to as the scan window. The line scan camera completes scanning at the end of the scan window. This is determined to be at some predetermined point (discussed below). The indication received from actuation sensor 328 is used by the processor to accurately determine the angular position of line scan camera 334. Additional sensors may be used to provide the processor with indications of multiple positions of line scan camera 334. In the preferred embodiment of the present invention, actuation sensor 328 is an optical sensor. However, any type of sensing means may be used to provide incremental or continuous indications of the rotational position of line scan camera 334.

Figure 8:
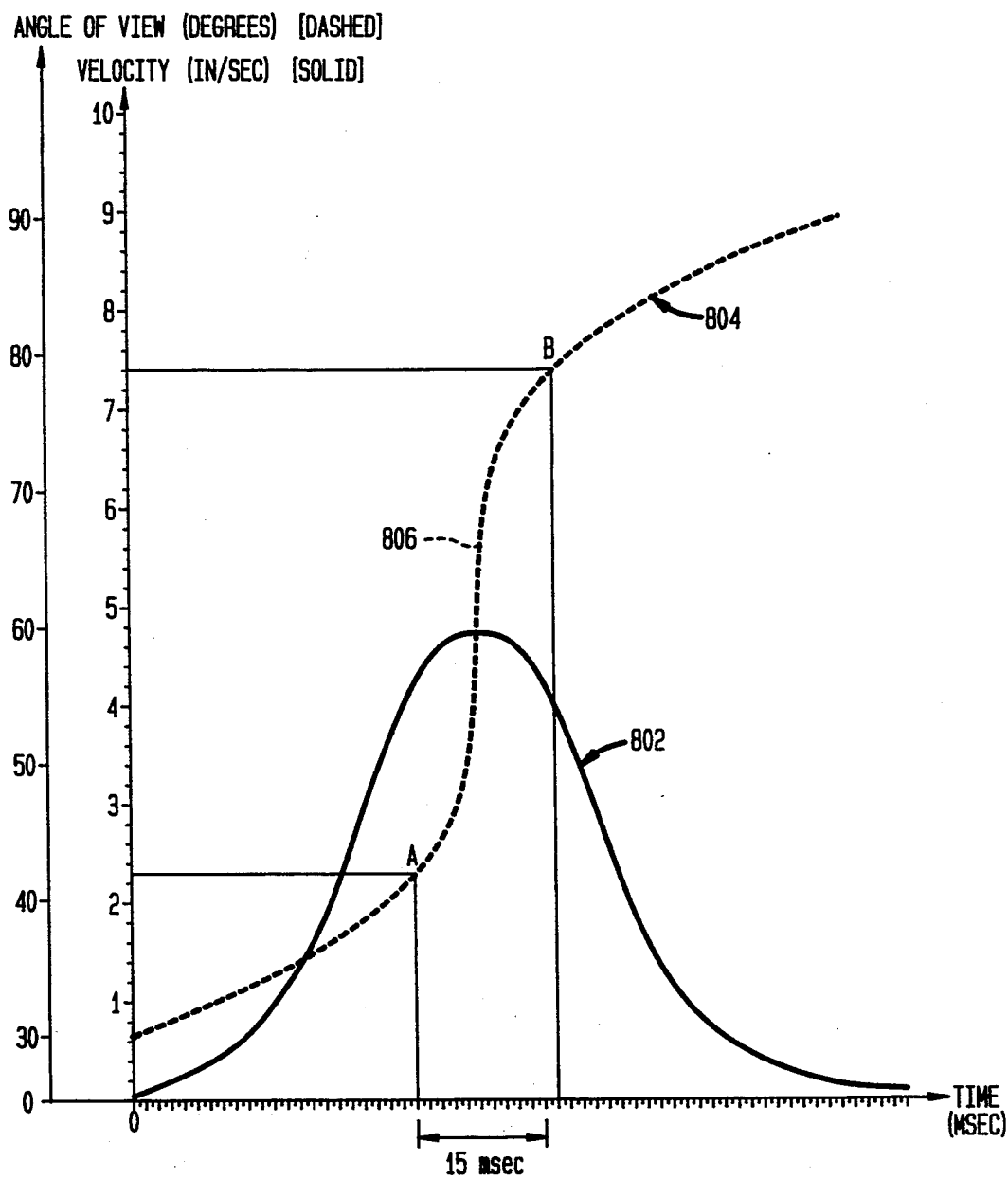
FIG. 8 is a graphical illustration of the velocity profile and angle of view of the line scan camera as it is swept by the dynamic sweeping mechanism.
Figure 9:
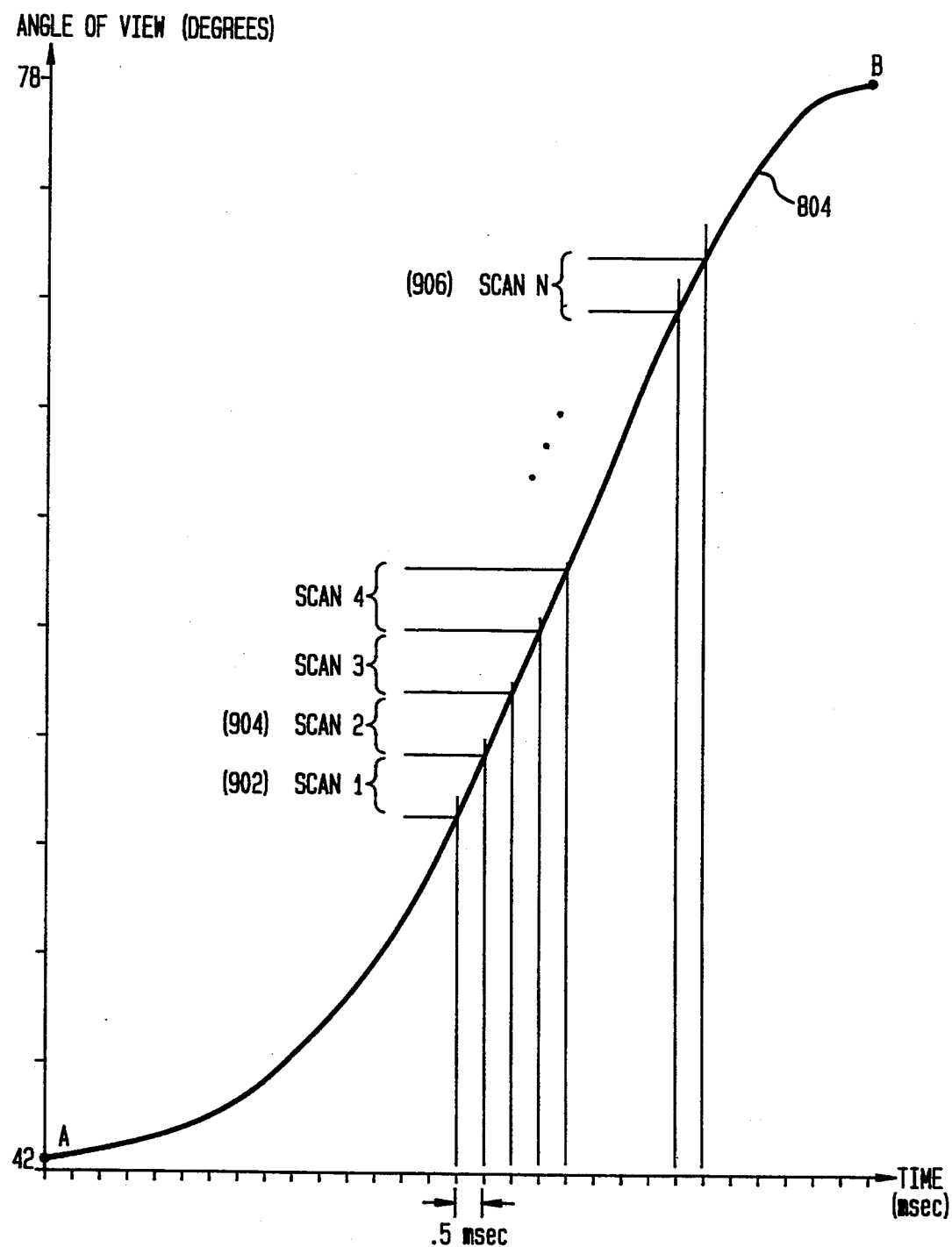
FIG. 9 is a graphical illustration of the portion of the velocity profile during which the line scan camera performs multiple scans of the object.

The relationship between the velocity of line scan camera 334 and incidence angle 606 is shown in FIGS. 8 and 9. Referring to FIGS. 8 and 9, the rotational motion of line scan camera 334 has a parabolic velocity profile 802. The resulting angle of view or incidence angle 606 changes according to the sweep position profile 804 shown in FIG. 8. Thus, as the velocity of line scan camera 334 goes from zero to a maximum and then back to zero again, the incidence angle 606 travels from 31° to 90°. As shown in FIG. 8, the rate at which the incidence angle 606 increases is greatest when the velocity of the line scan camera is greatest.

FIG. 9 illustrates a portion 806 of line scan camera sweep position profile 804 in which the line scan camera 334 performs multiple scans. Portion 806 is referred to as the scan window of sweep position profile 804. Scan window 806 is delimited by points A and B, as shown in FIGS. 8 and 9. The time scale in FIG. 8 is different than that in FIG. 9. Thus, sweep position profile 804 appears differently in these two figures. Actuation sensor 328 is used to determine when line scan camera 334 is at point A in the sweep position profile 804. Once point A is known, all other points on sweep position profile 804 may be computed. As shown in FIG. 9, the region of scan window 804 chosen to perform multiple scans is that in which the change in velocity is essentially constant. That is, the slope of profile 804 in the chosen region is approximately constant. Line scan camera 334 performs a single scan in approximately 0.5 milliseconds. Thus, referring to FIG. 9, line scan camera 334 performs the first scan in the region indicated by reference number 902. It then immediately performs the next scan in the region indicated by reference 904. Line scan camera 334 continues performing scans of the object until the Nth scan in the region indicated by reference 906. The processor can then accurately predict the position at which line scan camera 334 was when it outputs each "slice" of the object image. Thus, the present invention enables line scan camera 334 to be used to obtain enough image-based data to create a two-dimensional image.

In the preferred embodiment of the present invention, a typical spring/mass/damper system is used to control the movement of the dynamic sweeping mechanism. However, as one skilled in the relevant art would know, any type of mechanism may be used which will control the sweeping of line scan camera 334 in a constant or predictable manner, and at a speed which is sufficient to allow line scan camera 334 to make the necessary sweeps through the object for the processor to successfully build the object image.

VII. Electrical Interface

Referring to FIG. 3, there are four mounting standoffs 320 to accept mounting of a printed circuit board (not shown) thereon. This printed circuit board provides the initial interface for line scan camera 334, light assembly 336, and actuation sensor 328, with the rest of the robotic system.

VIII. Line Scan Camera Relative Positioning

Figure 6:
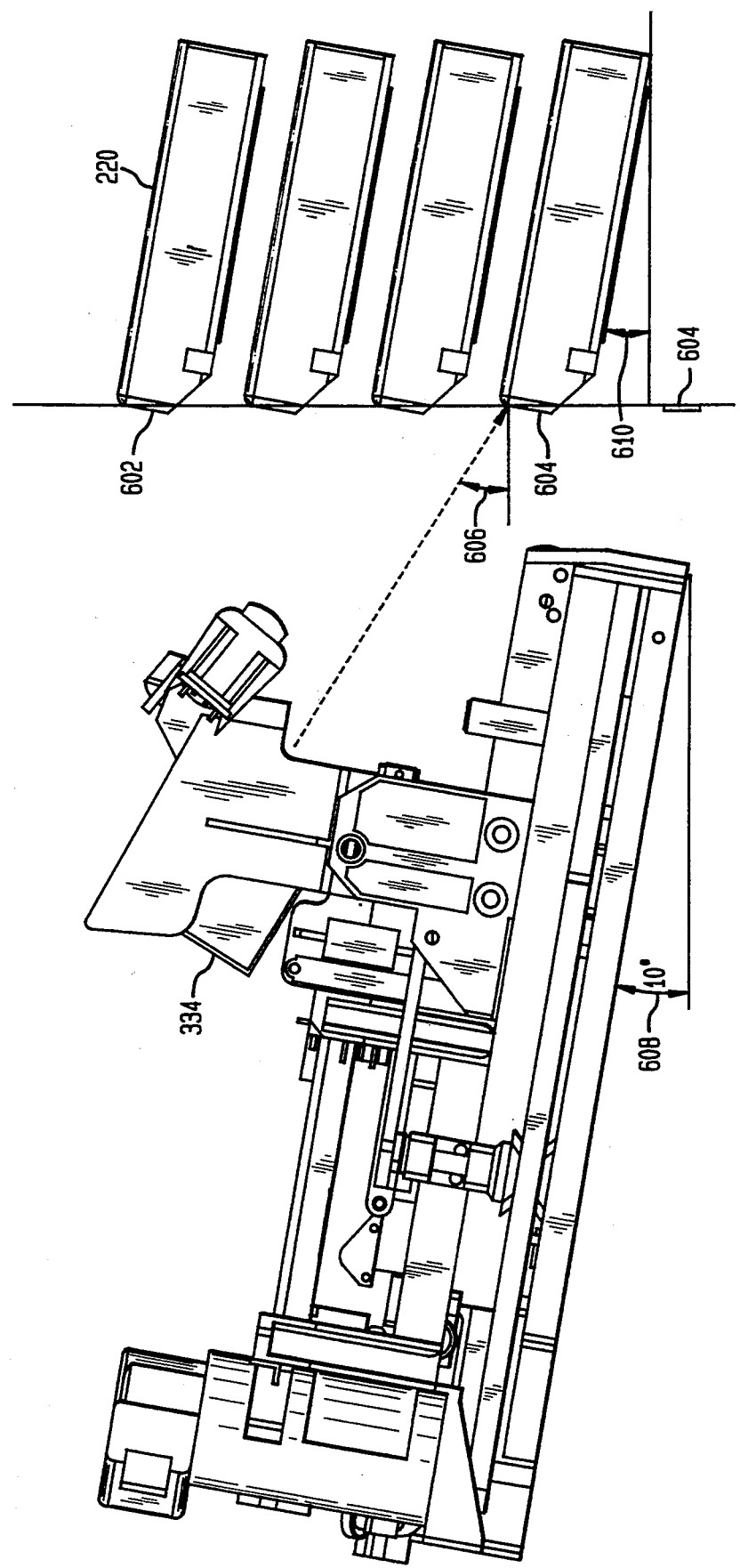
FIG. 6 is a side view of the gripper hand mechanism with the line scan camera in its normal position.

FIG. 6 illustrates the relative positioning of robotic hand mechanism 200 and line scan camera 334. In the preferred embodiment of the present invention, robotic hand assembly 300 is used in an automated storage system 100 in which the objects are IBM 3480-type magnetic tape cartridges. The computer tape cartridges 220 are labeled with bar coded labels 602, which are adhered to the front surface of the cartridge. Line scan camera 334 views the bar code labels and forms a database to catalog the contents of library system 100. In addition, calibration targets 604 are located throughout library system 100 to provide a known position with which the robotic arm may calibrate its position.

Magnetic tape cartridges 220 are stored in the cartridge storage cell locations 104 (not shown) at a 10° front-to-back declination angle 610 as shown. This storage angle prevents inadvertent movement of cartridges 220 in cartridge storage cells 104. To align gripper mechanism 214 with magnetic tape cartridges 220, robotic hand assembly 300 is also positioned at a 10° angle. This is referred to as the reach axis travel angle 608.

Line scan camera 334 is positioned at a 21° angle relative to robotic hand mechanism 200. This enables the line scan camera's field of view to extend over a retrieved magnetic tape cartridge 220 which is held in gripper mechanism 214 (not shown). The resulting incidence angle 606 of line scan camera 334 is 21° to view bar code labels 602. Since the calibration patterns 64 are not positioned at a 10° storage angle, the incidence angle 606 to view calibration targets 604 is 31°.

The bar code label which is used to identify each magnetic tape cartridge 220 has a height to width ratio which prevents the line scan camera from obtaining valid information with a single scan if the tilt angle of the bar code label is greater than approximately 2°. Having an incidence angle 606 of 21° requires multiple scans of line scan camera 334 to obtain the necessary information to build an object image. Thus, for low aspect ratio type labels, stationary, single scan, bar code reading becomes unreliable. Sweeping line scan camera 334 enables the line scan camera to make a series of scans of bar code label 602, which may result in the necessary information to create an object image of bar code label 602. Also, the 31° incidence angle at which line scan camera 334 views the calibration targets prevents the line scan camera from quickly and accurately determining the position of the robotic arm in relation to the work space. Examples of the calibration patterns 604 are those described in U.S. Pat. No. 4,908,777 to Wolfe and U.S. Pat. No. 5,034,904 to Moy, both of which are incorporated herein by reference in their entirety.

In addition, there may be positional errors of either the bar code label or calibration pattern, resulting from their being disposed at arbitrary positions or inclinations on their reference surface. There may also be positional errors of line scan camera 334, resulting from deviations in the mechanical stackup and positional tolerances of vertical support members 326, sweep mechanism pivot 316, bracket mounting arm 348, etc.

Sweeping line scan camera 334 in a direction perpendicular to the scan direction enables line scan camera 334 to provide the processor necessary information to build a two-dimensional image. Such information may be necessary when line scan camera 334 is scanning calibration target 604 to obtain a two-dimensional image, as well as bar code labels 602 to identify cartridges 220. For example, the dynamic sweeping mechanism of the present invention may be used to enable line scan camera 334 to scan Optical Character Recognition (OCR) dam or verify magnetic tape cartridge 220 during pick and place operations.

Figure 7:
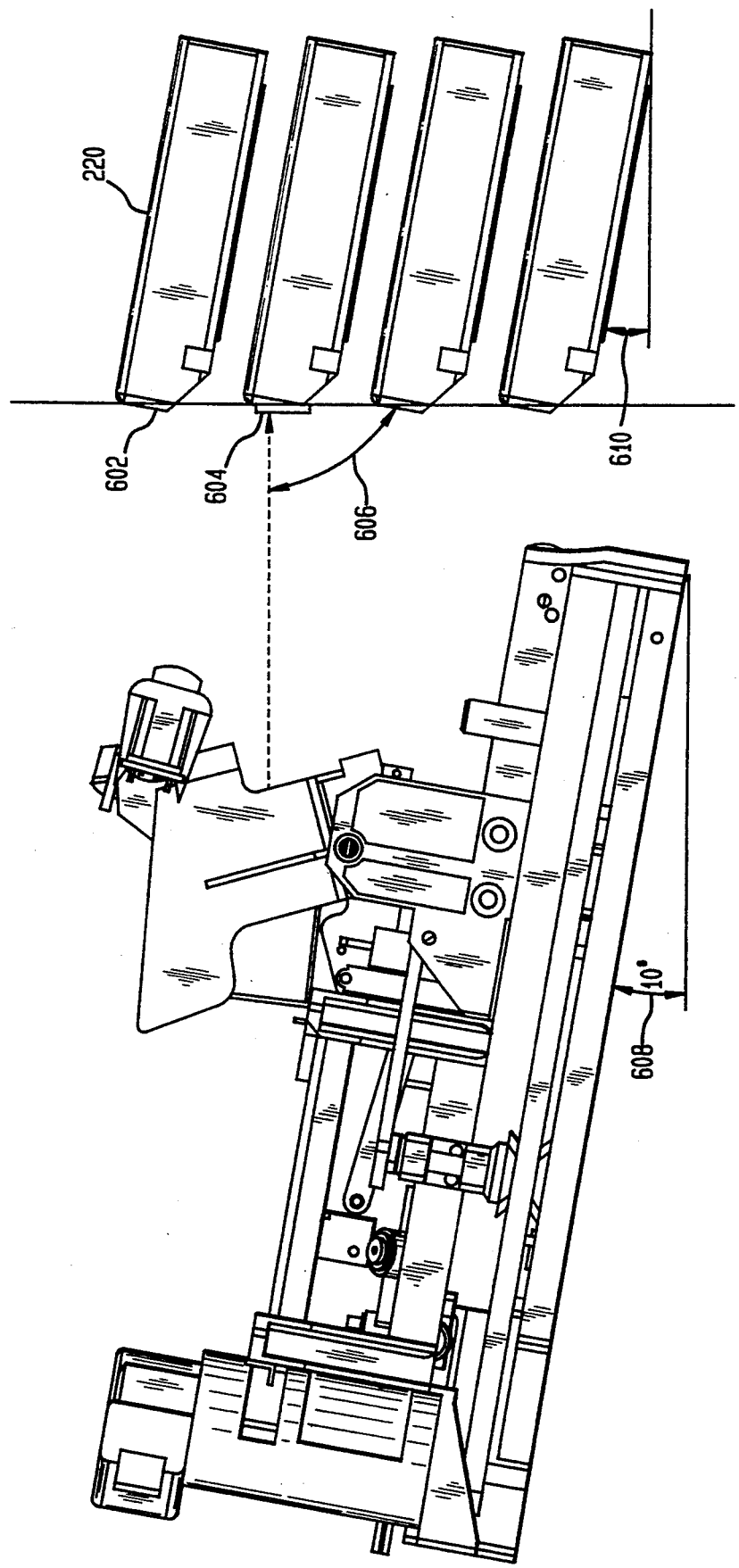
FIG. 7 is a side view of the gripper hand mechanism with the line scan camera in the latch up position.

FIG. 7 shows line scan camera 334 in its up and unlatched position. This position is achieved after line scan camera 334 has completed its sweeping motion from the position shown in FIG. 6. In this position, incidence angle 606 of line scan camera 334 relative to calibration targets 604 is 90°. During the sweep of line scan camera 334 from its down and locket position to the up and unlatched position, line scan camera 334 passes through the 21° angle. At this angle, the field of view tilt angle 606 with bar code labels 602 is 90°.

When the incidence angle 606 is 90° with the object, the typical problems of optical parallax associated with differing angle of views are eliminated. Also, the sweeping of line scan camera 334 enables it to resolve an optical image of whatever is in its sweep range of view by making multiple scans of the object. Sweep mechanism pivot point 316 has been chosen to provide an optimum "distance to object" depth, whether line scan camera 334 is in the down and latched or up and unlatched positions.

Thus, the dynamic sweeping mechanism of the present invention sweeps the line scan camera's field of view at the camera's working distance through the object to be imaged while staying in the camera's focal range, obtaining the necessary information to generate a two-dimensional image of the object. The dynamic sweeping mechanism thus allows the reading of bar code labels while the robot is stationary, which is necessary for label verification. In addition, the dynamic sweeping mechanism enables improved high-speed calibration target reading and positioning. This may be accomplished during normal robot moves, eliminating the need for special robotic positioning to read a calibration pattern.

The dynamic sweeping mechanism of the present invention achieves this increased operational efficiency while eliminating the parallax problems experienced due to the mounting angle of the line scan camera. In addition, the present invention utilizes the pre-existing reach drive system, thereby reducing the complexity and weight of the robotic hand assembly.

While various embodiments of the present invention have been described above, it should be understood that they have been presented by way of example, and not limitation. Thus the breadth and scope of the present invention should not be limited in any of the above-described exemplary embodiments, which should be defined only in accordance with the following claims and their equivalents.

What is claimed is:

1. An apparatus for use with a robotic arm mechanism and a line scan camera for dynamically sweeping a scan line of the line scan camera across an object for image detection, comprising:

pivot means for pivotally coupling the line scan camera to the robotic arm mechanism and for allowing said line scan camera to pivot about an axis parallel to the scan line such that said scan line sweeps through an arc perpendicular to the scan line;

drive means, coupled to said pivot means and the line scan camera, for pivoting the line scan camera through said arc; and latching means, coupled to said pivot means, for securing the line scan camera at a desired angular position and for unlatching the line scan camera from said secured position, thereby controlling the ability of said drive means to pivot said line scan camera through said arc.

2. The apparatus of claim 1, wherein said pivot means further comprises:

mounting bracket for coupling a light assembly to the line scan camera;

extension means for mechanically supporting the line scan camera and said light assembly adjacent to the robotic arm mechanism; and release catch plate configured to rotationally couple said mounting bracket to said extension means.

3. The apparatus of claim 1, wherein the robotic arm assembly includes a drive mechanism and wherein said drive means comprises:

coupling means for selectively coupling said pivot means to said drive mechanism.

4. The apparatus of claim 1, wherein said drive means comprises:

a motor configured to drive the line scan camera through said arc.

5. The mechanism of claim 1, wherein said drive means further comprises:

a camera sweeping spring coupled to said pivot means; and a return damper configured to control the force applied by said camera sweeping spring to said pivot means, wherein the operation of said camera sweeping spring and said return damper are controlled by said latching means.

6. The mechanism of claim 3, wherein drive mechanism of said robotic arm mechanism is a motor and pulley drive system; and wherein said coupling means includes a drive pulley coupled to and rotationally driven by said motor and pulley drive system.

7. The mechanism of claim 3, wherein said coupling means further comprises:

linkage means for coupling a drive pulley to said pivot means and for converting an angular rotation of said motor and pulley drive system to an angular rotation of said pivot means around said axis.

8. An robotic hand assembly for use in an automated cartridge system, comprising:

a robotic hand mechanism;

a line scan camera configured to sweep along a scan line to define an angle of view; and a dynamic sweeping mechanism for sweeping said angle of view through a displacement substantially perpendicular to said scan line including, pivot means for mechanically coupling the line scan camera to the robotic hand mechanism and for allowing said line scan camera to pivot about an axis parallel to the scan line such that said scan line sweeps through an arc perpendicular to the scan line, and latching means, coupled to said pivot means, for securing the line scan camera at a desired angular position and for unlatching the line scan camera from said secured position.

9. The robotic hand assembly of claim 8, wherein said robotic hand mechanism comprises a reach drive system configured to extend and retract a gripper mechanism to retrieve and replace said tape cartridges in said tape storage system, said objects including tape cartridge identifiers and positional targets.

10. The robotic hand assembly of claim 9, wherein said dynamic sweeping mechanism further comprises:

drive means, coupled to said pivot means and the line scan camera, for pivoting the line scan camera through said arc.

11. The robotic hand assembly of claim 10, wherein said pivot means further comprises:

mounting bracket for coupling a light assembly to the line scan camera;

extension means for mechanically supporting the line scan camera and said light assembly adjacent to the robotic hand mechanism; and release catch plate configured to rotationally couple said mounting bracket to said extension means.

12. The robotic hand assembly of claim 10, wherein said latching means enables said coupling means to pivot said line scan camera through said arc.

13. The robotic hand assembly of claim 10, wherein the robotic hand assembly includes a drive mechanism and wherein said drive means comprises:

coupling means for selectively coupling said pivot means to said drive mechanism.

14. The robotic hand assembly of claim 10, wherein said drive means comprises:

a motor configured to drive the line scan camera through said arc.

15. The robotic hand assembly of claim 12, wherein said drive means further comprises:
- a camera sweeping spring coupled to said pivot means, said camera sweeping spring configured to apply a force to said pivot means; and
- a return damper configured to control said force applied by said camera sweeping spring to said pivot means,
- wherein the operation of said camera sweeping spring and said return damper are controlled by said latching means.

16. The robotic hand assembly of claim 13, wherein drive mechanism of said robotic hand mechanism is a motor and pulley drive system; and
- wherein said coupling means includes a drive pulley coupled to and rotationally driven by said motor and pulley drive system.

17. The robotic hand assembly claim 16, wherein said coupling means further comprises:
- linkage means for coupling said drive pulley to said pivot means and for converting an angular rotation of said motor and pulley drive system to an angular rotation of said pivot means around said axis.

* * * * *